(12) United States Patent
Wehner et al.

(10) Patent No.: US 11,596,107 B2
(45) Date of Patent: Mar. 7, 2023

(54) CHOPPING UNIT OF A FORAGE HARVESTER AND SHEAR BAR FOR A CHOPPING UNIT

(71) Applicant: CLAAS Saulgau GmbH, Bad Saulgau (DE)

(72) Inventors: Gregor Wehner, Ostrach-Unterweiler (DE); Josef Unger, Ostrach (DE); Manuel Hugger, Riedlingen (DE)

(73) Assignee: CLAAS SAULGAU GMBH, Bad Saulgau (DE)

( * ) Notice: Subject to any disclaimer, the term of this patent is extended or adjusted under 35 U.S.C. 154(b) by 57 days.

(21) Appl. No.: 15/941,028

(22) Filed: Mar. 30, 2018

(65) Prior Publication Data
US 2018/0279560 A1 Oct. 4, 2018

(30) Foreign Application Priority Data
Mar. 31, 2017 (DE) .......................... 102017107025.7

(51) Int. Cl.
*A01F 29/06* (2006.01)
*B02C 18/18* (2006.01)
(Continued)

(52) U.S. Cl.
CPC ............ *A01F 29/06* (2013.01); *A01F 29/095* (2013.01); *B02C 18/145* (2013.01); *B02C 18/18* (2013.01);
(Continued)

(58) Field of Classification Search
CPC ...... B27L 11/00; B27L 11/002; B27L 11/005; B27L 11/02; B27L 11/04; B27L 11/06;
(Continued)

(56) References Cited

U.S. PATENT DOCUMENTS 4,298,170 A * 11/1981 Snavely .................. A01F 29/06
241/222
4,651,936 A 3/1987 Fleming
(Continued)

FOREIGN PATENT DOCUMENTS

DE 2806311 A1 8/1979
DE 3526398 * 7/1986
(Continued)

OTHER PUBLICATIONS

EP2298064A1 machine translation (Year: 2010).*
(Continued)

*Primary Examiner* — Shelley M Self
*Assistant Examiner* — Fred C Hammers

(57) ABSTRACT

A chopping unit (10) of a forage harvester, having a chopping drum (11) bearing chopping blades (15), having a shear bar carrier (17) bearing a shear bar (16) for the chopping blades (15), wherein a top side (20), facing away from the shear bar carrier (17), of the shear bar (16) provides a cutting edge (21) of the shear bar (16), wherein the top side (20) of the shear bar (16) is contoured such that the top side (20) of the shear bar (16) is inclined, at least in a top-side portion (26) facing the chopping drum (11), continuously in the direction of the chopping drum (11) in the contact region with the chopping blades, as seen in the axial direction of the chopping drum (11).

6 Claims, 5 Drawing Sheets

(51) Int. Cl.
  *B02C 18/22* (2006.01)
  *B02C 18/14* (2006.01)
  *A01F 29/09* (2010.01)

(52) U.S. Cl.
  CPC .... *B02C 18/2283* (2013.01); *B02C 2018/188* (2013.01)

(58) Field of Classification Search
  CPC .......... B27L 11/08; A01F 29/06; A01F 29/02; A01F 29/095; A01F 12/40; A01F 29/22; B02C 18/18; B02C 18/225; B02C 18/2283; B02C 18/145; B02C 2018/188; A01D 34/62; A01D 43/08; A01D 43/086; A01D 43/088
  See application file for complete search history.

(56) References Cited

U.S. PATENT DOCUMENTS

| | | | | |
|---|---|---|---|---|
| 5,340,042 | A | * 8/1994 | Bergkamp | A01D 34/14 56/298 |
| 5,713,525 | A | * 2/1998 | Morey | B02C 18/144 241/222 |
| 5,829,700 | A | 11/1998 | Pianca et al. | |
| 2017/0113227 | A1 | * 4/2017 | Smeets | B27L 11/005 |

FOREIGN PATENT DOCUMENTS

| | | | | |
|---|---|---|---|---|
| DE | 3526398 | A1 * | 7/1986 | ............. A01F 29/00 |
| DE | 3526398 | A1 * | 2/1987 | ........... A01F 29/095 |
| DE | 8813953 | U1 | 1/1989 | |
| DE | 19650058 | A1 | 6/1998 | |
| DE | 19651694 | A1 * | 6/1998 | ........... A01F 29/095 |
| DE | 19651694 | A1 | 6/1998 | |
| DE | 19652656 | A1 | 6/1998 | |
| DE | 19918553 | A1 | 10/2000 | |
| DE | 102013011088 | | 1/2016 | |
| EP | 2298064 | A1 * | 3/2011 | ............. A01F 29/06 |
| FR | 1183637 | | * 10/1957 | |
| FR | 2329181 | A1 | 5/1977 | |

OTHER PUBLICATIONS

EP2298064A1 (Year: 2010).*
FR1183637 machine translation (Year: 1957).*
FR1183637 (Year: 1957).*
DE3526398A1 (Year: 1986).*
DE3526398A1 Mt (Year: 1986).*
DE19651694A1 machine translation (Year: 1998).*
DE19651694A1 (Year: 1998).*
DE3526398A1 (Jul. 24, 1986) MT, Reber, etalia (Year: 1986).*
DE 19 651 694 A1 Complete (Jun. 25, 1998), Foegling (Year: 1998).*
Reber, etalia (DE 3526398) (Year: 1986).*

* cited by examiner

CHOPPING UNIT OF A FORAGE HARVESTER AND SHEAR BAR FOR A CHOPPING UNIT

The invention relates to a chopping unit of a forage harvester and to a shear bar for a chopping unit.

DE 196 52 656 B4 discloses a chopping unit of a forage harvester, said chopping unit having a chopping drum which bears a plurality of chopping blades. The chopping unit also has a shear bar for the chopping blades, which is mounted on a shear bar holder. The shear bar holder is also referred to as a saddle or anvil. Beneath the chopping drum there extends a base element which is configured as a base plate, wherein the base element is fastened releasably to the shear bar holder with a portion facing the shear bar holder. The shear bar of the chopping unit according to DE 196 52 656 B4 comprises a top side facing away from the shear bar holder and an underside facing the shear bar holder, wherein the top side of the shear bar and the underside of the shear bar extend continuously parallel to one another as seen in the axial direction of the chopping drum and are inclined away from the chopping drum.

DE 196 51 694 A1 discloses a further chopping unit of a forage harvester having a shear bar. According to DE 196 51 694 A1, the shear bar has, on its top side facing the entering harvested material and facing away from the shear bar holder, shaped profiles, the borders of which regionally form longitudinal cutters which extend in the direction of flow of the harvested material, wherein at least one cross cutter is arranged downstream of the longitudinal cutters.

All of the shear bars, known from the prior art, of chopping units are designed to optimize cutting in the region of the chopping drum. As a result, the ease of reception of the chopping drum for the harvested material can drop and a blockage tendency can increase.

There is a need for a chopping unit of a forage harvester which is characterized by high ease of reception of the chopping drum with regard to the harvested material to be chopped up, and in which a so-called blockage tendency is reduced. Furthermore, there is a need for a shear bar for such a chopping unit.

On this basis, the present invention is based on the object of creating a novel chopping unit of a forage harvester and a shear bar for a chopping unit.

This object is achieved by a chopping unit of a forage harvester as claimed in claim 1. According to the invention, the top side, facing away from the shear bar holder, of the shear bar is contoured such that the top side of the shear bar is inclined, at least in a top-side portion facing the chopping drum, continuously in the direction of the chopping drum in the contact region with the chopping blades, as seen in the axial direction of the chopping drum.

On account of the inclination angle, dropping continuously in the direction of the chopping drum as seen in the axial direction of the chopping drum, of the top-side portion, facing the chopping drum, of the shear bar, the ease of reception of the chopping drum is increased and the blockage tendency reduced. The shear bar has no elevations or the like as seen in the axial direction of the chopping drum, and so the harvested material passes into the region of the chopping drum without any obstructions.

According to one development, the top side, facing away from the shear bar holder, of the shear bar is contoured in the top-side portion facing the chopping drum such that a first segment forming the cutting edge extends parallel or approximately parallel to an underside, facing the shear bar holder, of the shear bar, and such that a second segment, adjoining this first segment, is inclined in the direction of the chopping drum. This development not only ensures increased ease of reception of the drum and a reduction in the blockage tendency, but also ensures an optimum cutting angle for the harvested material to be chopped up in the region of the cutting edge configured as a cross cutter.

According to one development, the top side, facing away from the shear bar holder, of the shear bar is inclined continuously away from the chopping drum, as seen in the axial direction of the chopping drum, in a top-side portion facing away from the chopping drum. As a result, it is possible that, when the shear bar has become worn, to turn the shear bar and to reuse the latter.

Preferred developments of the invention can be gathered from the dependent claims and the following description. Exemplary embodiments of the invention are explained in more detail on the basis of the drawing, without being limited thereto. In the drawing:

The invention relates to a chopping unit of a forage harvester.

Furthermore, the invention relates to a shear bar for a chopping unit of a forage harvester.

Figure 1:
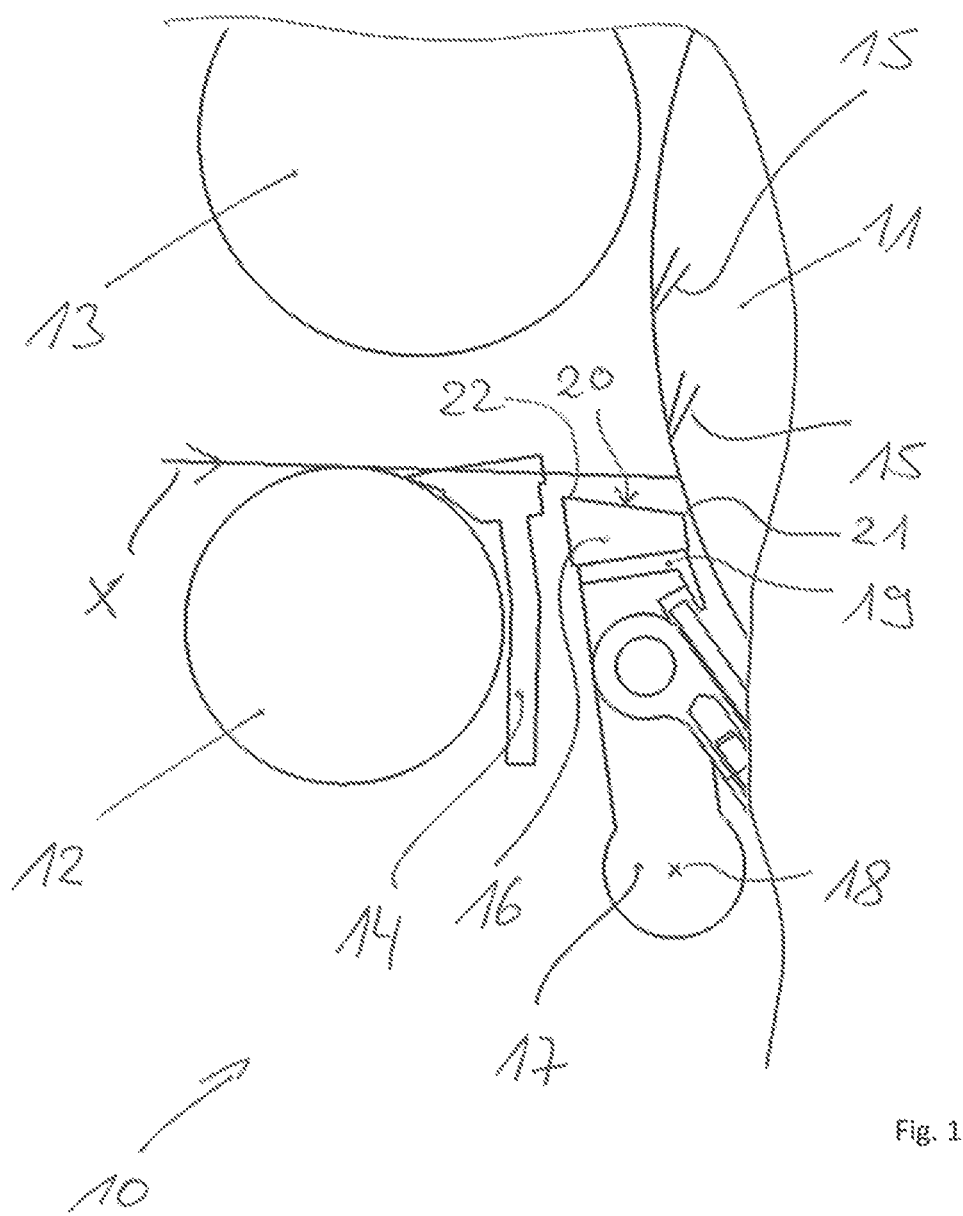
FIG. 1 shows a schematic cross section through a first chopping unit according to the invention of a forage harvester.

FIG. 1 shows a chopping drum 11 of a first chopping unit 10 according to the invention, wherein the chopping drum 11 of the chopping unit 10 is mounted upstream of a pair of precompression rolls 12, 13 as seen in the direction of the flow of material X. A so-called stripper 14 cooperates with the lower precompression roll 12.

The chopping drum 11 of the chopping unit 10 bears a plurality of chopping blades 15, wherein two such chopping blades 15 are shown in FIG. 1. With the chopping blades 15 there cooperates a shear bar 16, which is mounted on a shear bar holder 17. The shear bar holder 17 is preferably pivotable about a pivot axis 18, in order, in particular when the chopping cutters 15 become worn, to incline the shear bar 16 further in the direction of the chopping drum 11. As a result, the relative position of the shear bar 16 with respect to the chopping drum 11 and thus to the chopping blades 15 can be set. Arranged between the shear bar holder 17 and the shear bar 16 is strip 19.

In the exemplary embodiment, shown in FIG. 1, of a chopping unit 10 according to the invention, a top side 20, facing away from the shear bar holder 17, of the shear bar 16 is contoured such that the top side 20 of the shear bar 16 is inclined continuously in the direction of the chopping drum 11 as seen in the axial direction of the chopping drum 11, specifically starting from a cutting edge 21, provided by the top side 20, of the shear bar 16 in the direction of an opposite edge 22 of the top side 20 of the shear bar 16 from the cutting edge 21.

A virtual extension of the top side 20 of the shear bar 16 intersects a straight line, representing the direction of the flow of material X at a virtual intersection point, which is positioned upstream of the chopping drum 11 as seen in the direction of the flow of material X.

Accordingly, according to the invention, in the exemplary embodiment in FIG. 1, the top side 20, facing away from the shear bar holder 17, of the shear bar 16 is inclined continuously in the direction of the chopping drum 11 as seen in the axial direction of the chopping drum 11. Accordingly, the top side 20 of the shear bar 16 does not have any elevations or the like.

As a result, the ease of reception of the chopping drum 11 is increased and a blockage tendency in the region of the precompression rolls 12, 13 and of an intake housing is reduced. Harvested material passes into the region of the chopping drum 11 without any obstructions or the like.

Figure 2:
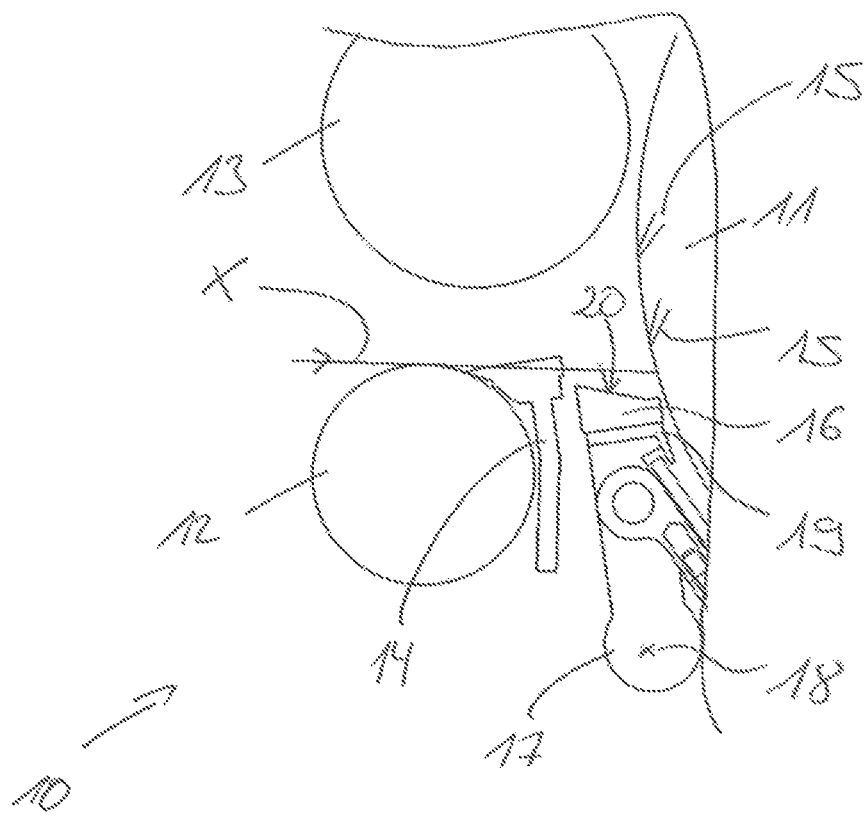
FIG. 2 shows a schematic cross section through a second chopping unit according to the invention of a forage harvester.
Figure 3:
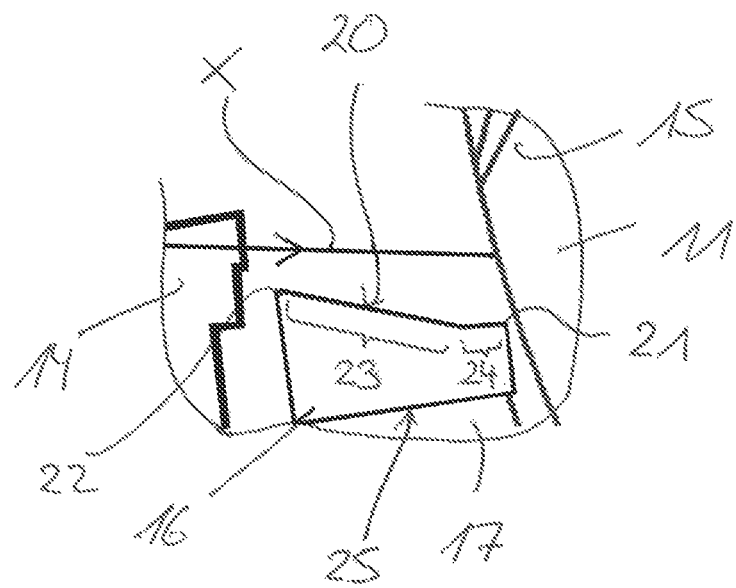
FIG. 3 shows a detail of FIG. 2.

FIGS. 2 and 3 show a detail of a second chopping unit 10 according to the invention, wherein the exemplary embodiment in FIGS. 2, 3 differs from the exemplary embodiment in FIG. 1 in that the top side 20, facing away from the shear bar holder 17, of the shear bar 16 is subdivided into two segments 23, 24.

The top side 20, facing away from the shear bar holder 17, of the shear bar 16 is in this case contoured such that that segment 24 of the top side 20 of the shear bar 16 that forms the cutting edge 21 serving as a cross cutter extends parallel or approximately parallel to an underside 25, facing the shear bar holder 17, of the shear bar 16, and is accordingly not inclined in the direction of the chopping drum 11, whereas the segment 23, adjoining this segment 24, of the top side 20 of the shear bar 16 is inclined in the direction of the chopping drum 11, specifically, as described with reference to FIG. 1, such that a virtual extension of the segment 23 of the top side 20 of the shear bar 16 intersects the axis of the direction of the flow of material X at a virtual intersection point which is positioned upstream of the chopping drum 11 as seen in the direction of the flow of material X.

As a result of the configuration in FIGS. 2 and 3, just like in the configuration in FIG. 1, the ease of reception of the chopping drum 11 for the harvested material is increased and a blockage tendency is reduced; furthermore, in the region of the cutting edge 21 serving as a cross cutter, an optimum cutting angle for the harvested material is provided.

The segments 23 and 24 of the top side 20 of the shear bar 16 are each contoured continuously in the same shape as seen in the axial direction of the chopping drum 11—at least in the contact region with the chopping blades—such that no elevations or the like are formed in the region of the two segments 23, 24.

Figure 4:
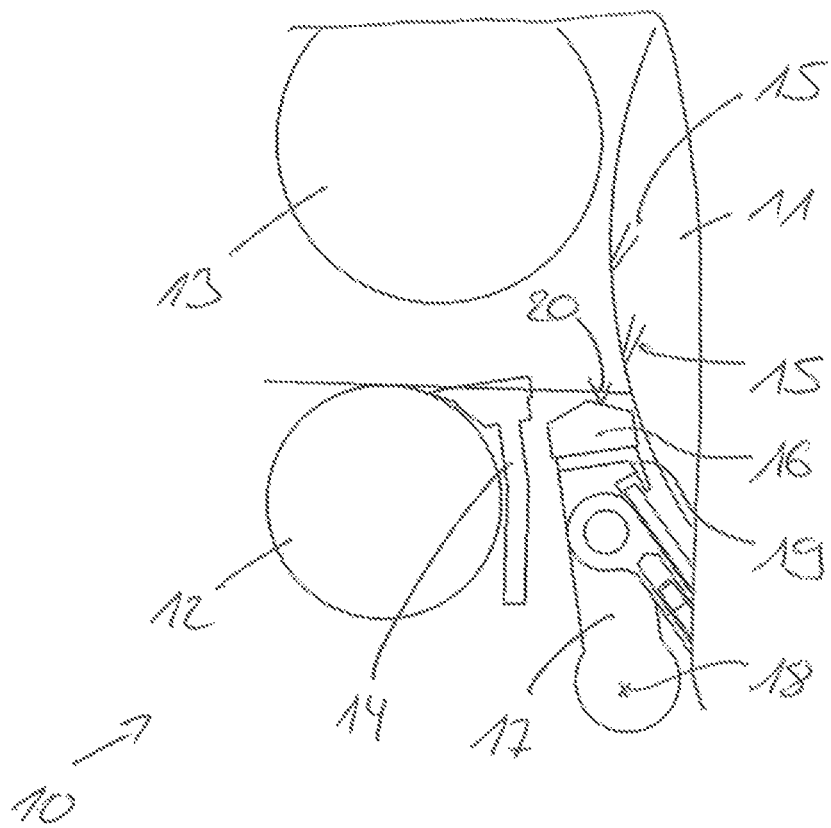
FIG. 4 shows a schematic cross section through a third chopping unit according to the invention of a forage harvester.
Figure 5:
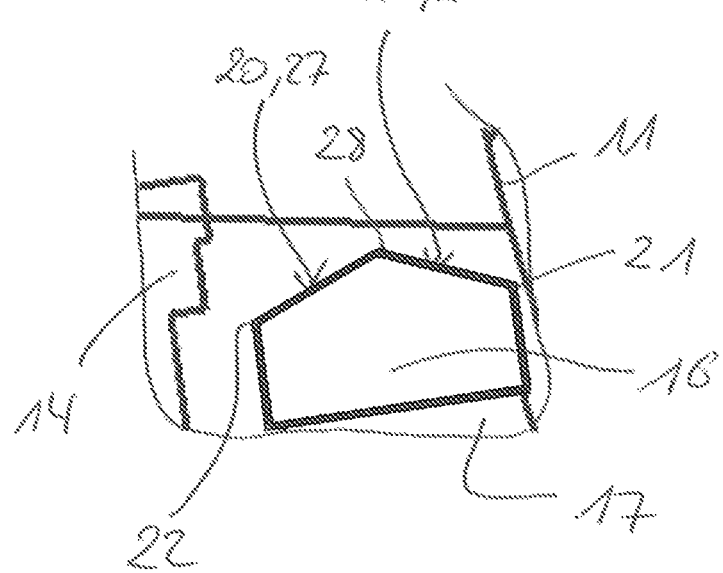
FIG. 5 shows a detail of FIG. 4.

A further exemplary embodiment of a chopping unit 10 according to the invention is shown in FIGS. 4 and 5. In the exemplary embodiment in FIGS. 4 and 5, the top side 20, facing away from the shear bar holder 17, of the shear bar 16 is subdivided into two top-side portions 26, 27, wherein the top-side portion 26, which forms the cutting edge 21 and faces the chopping drum 11, is inclined in the direction of the chopping drum 11, while the top-side portion 27 of the top side 20 of the shear bar 16, which forms the opposite edge 22 of the top side 20 from the cutting edge 21 and faces away from the chopping drum 11, is inclined away from the chopping drum 11, wherein these two top-side portions 26, 27 intersect one another at an intersection line 28, forming roof-shaped contouring of the top side 20 of the shear bar 16. The region in which the two top-side portions 26, 27 meet one another can also be somewhat flattened.

The intersection line 28 of the two top-side portions 26, 27 extends in this case in the axial direction of the chopping drum 11, wherein the two top-side portions 26, 27 are preferably formed symmetrically with respect to this intersection line 28, such that, by simply turning the shear bar 16 after the cutting edge 21 has become worn, the opposite edge 22 can be used as a new cutting edge.

Figure 6:
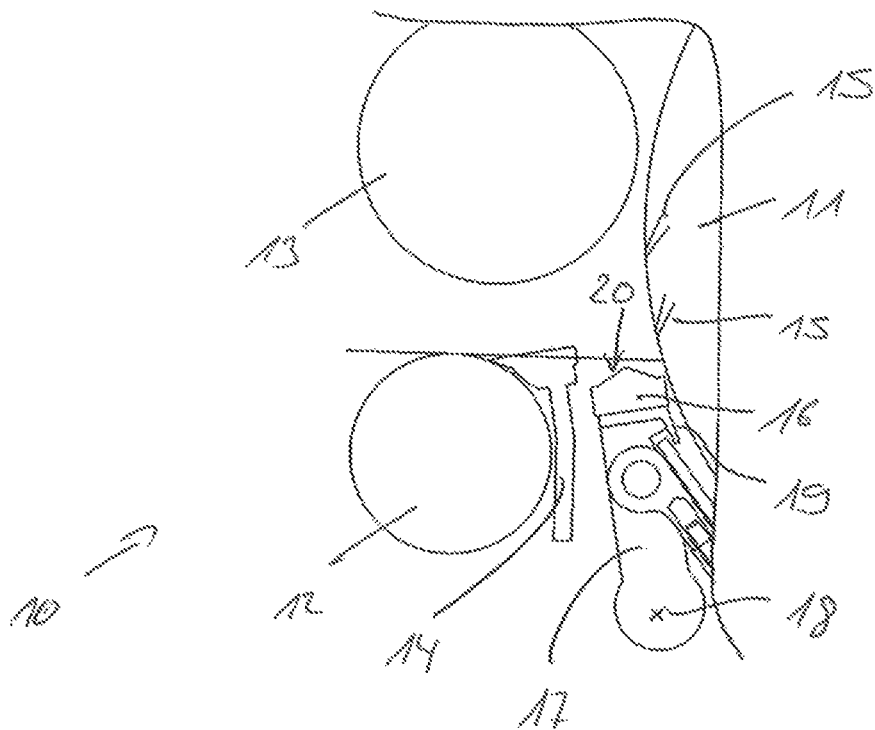
FIG. 6 shows a schematic cross section through a further chopping unit according to the invention of a forage harvester.
Figure 7:
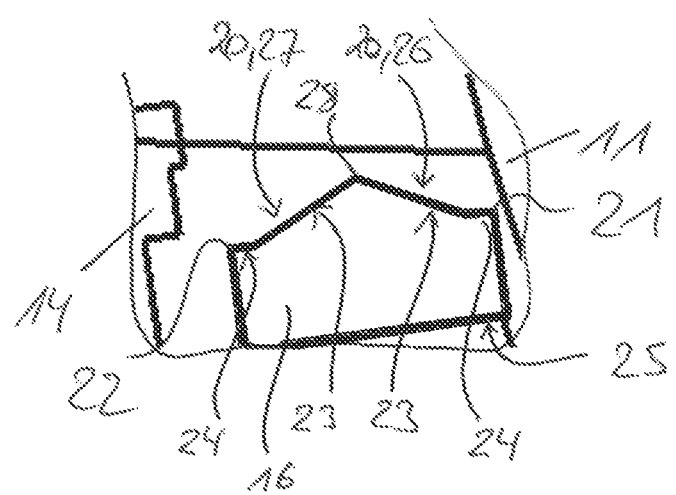
FIG. 7 shows a detail of FIG. 6.

A further exemplary embodiment of the invention is shown in FIGS. 6 and 7. The exemplary embodiment in FIGS. 6 and 7 combines the features of the exemplary embodiments in FIGS. 2, 3 and FIGS. 5, 6.

Thus, in the exemplary embodiment in FIGS. 6 and 7, the two differently inclined top-side portions 26, 27 of the top side 20 of the shear bar 16 are subdivided into the two segments 23, 24, wherein the segments 24 of the top-side portions 26, 27 extend in turn parallel to an underside 25 of the shear bar, whereas the segments 23 are inclined, namely the segment 26 of the top-side portion 26 is inclined toward the chopping drum 11 and the segment 26 of the top-side portion 27 is inclined away from the chopping drum 11, specifically in turn forming roof-shaped contouring of the top side 20 of the shear bar 16, the intersection line 28 of which extends in the axial direction of the chopping drum 11.

As a result of the contouring according to the invention of the shear bar 16 in the region of its top side 20 facing away from the shear bar holder 17, the ease of reception of the chopping drum 11 with respect to the harvested material to be chopped up is increased. A blockage tendency in the region of the precompression rolls 12, 13 or of an intake housing is reduced.

The symmetrical configuration of the exemplary embodiments in FIGS. 4, 5 and FIGS. 6, 7 is preferred, since the shear bar 16 can be reused by being turned after it has become worn.

In this case, the embodiment in FIGS. 6, 7 is particularly preferred, since said embodiment additionally also ensures an optimum cutting angle in the region of the cutting edge 21 in order to increase the ease of reception.

Figure 8:
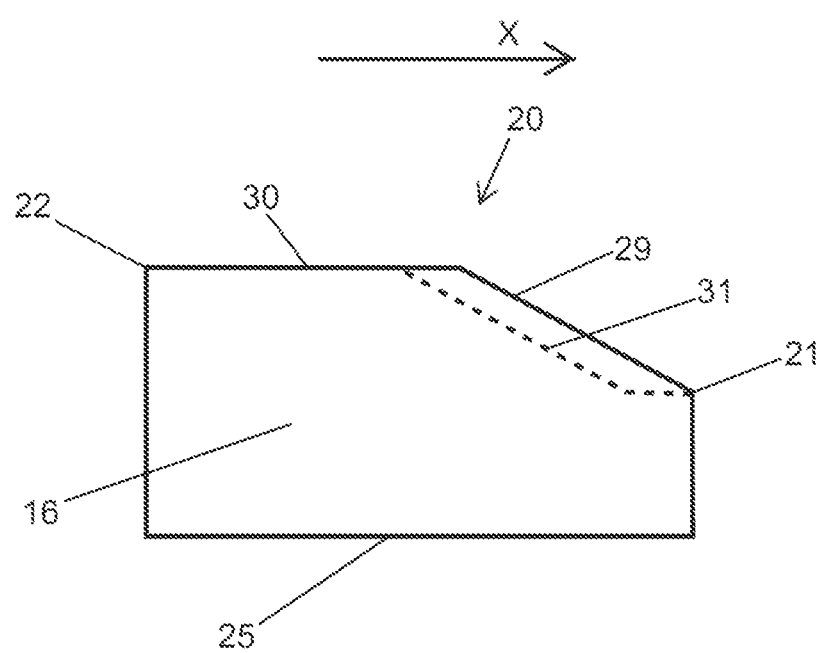
FIG. 8 shows a schematic cross section through a detail of a further chopping unit according to the invention of a forage harvester.

A further exemplary embodiment of a chopping unit 10 according to the invention is shown in FIG. 8. In the exemplary embodiment in FIG. 8, the top side 20, facing away from the shear bar holder 17, of the shear bar 16 is subdivided into two top-side portions 29, 30, wherein the top-side portion 29, which forms the cutting edge 21 and faces the chopping drum 11, is inclined in the direction of the chopping drum 11, while the top-side portion 30 of the top side 20 of the shear bar 16, which forms the opposite cutting edge 22 of the top side 20 from the cutting edge 21 and faces away from the chopping drum 11, extends parallel or approximately parallel to the underside 25 of the shear bar 16.

In a manner corresponding to the exemplary embodiments according to FIG. 2 or 3, the top-side portion 29 facing the chopping drum 11 can additionally—as illustrated by the dashed line 31—be subdivided into two segments. The segment that forms the cutting edge 21 serving as a cross cutter extends parallel or approximately parallel to the underside 25 of the shear bar 16 and forms a more favorable cutting angle together with the chopping blades 15. The other segment is inclined toward the chopping drum 11 in the direction of the flow of material X and improves the ease of reception of the chopping drum 11.

A correspondingly designed shear bar 16 can be used in the illustrated installation position with regard to the direction of the flow of material X for problematic harvesting conditions. For more favorable harvesting conditions, a shear bar 16 contoured as per FIG. 8 can advantageously be easily used, such that the top-side portion 30 with the cutting edge 22 cooperates with the chopping drum 11.

With the above-described chopping units and shear bars according to the invention, the harvesting result can be improved in particular in the case of problematic harvesting conditions, such as in the case of wet, sticky grass.

LIST OF REFERENCE SIGNS

10 Chopping unit
11 Chopping drum
12 Precompression roll
13 Precompression roll
14 Stripper
15 Chopping blade
16 Shear bar
17 Shear bar holder
18 Axis
19 Strip
20 Top side
21 Cutting edge
22 Edge
23 Segment
24 Segment
25 Underside
26 Top-side portion
27 Top-side portion
28 Intersection line
29 Top-side portion
30 Top-side portion
31 Dashed line

The invention claimed is:

1. A chopping unit (10) of a forage harvester comprising, a chopping drum (11) bearing chopping blades (15), a shear bar carrier (17) bearing a shear bar (16) for the chopping blades (15), wherein a top side (20) of the shear bar (16), facing away from the shear bar carrier (17), provides a singular cutting edge (21) of the shear bar (16) adjacent the chopping drum (11), wherein
the top side (20) of the shear bar (16) extends between the singular cutting edge (21) adjacent the chopping drum 11 and an opposite edge (22) of the shear bar (16) and has a plurality of planar segments, including a first top-side planar segment (27) and a second top-side planar segment (26) of the shear bar (16) and wherein the second top-side planar segment (26) extends from the singular cutting edge (21) towards the middle portion and the first top-side planar segment (27) extends from the opposite edge (22) toward the first top-side planar segment (26), and wherein the shear bar (16) generally increases in thickness from the singular cutting edge (21) to a middle portion of the shear bar (16) and also generally increases in thickness from the opposite edge (22) to the middle portion thereby forming roof-shaped contouring of the top side (20) of the shear bar (16).

2. The chopping unit 10 claimed as in claim 1, further comprising two additional top-side segments (24), one of the additional top-side segments being disposed between the cutting edge (21) and the second top-side planar segment (26) and the other of the additional top-side segments being disposed between the opposite edge (22) and the first top-side planar portion (27).

3. The chopping unit 10 as claimed in claim 2, wherein the two additional top-side portions are parallel or approximately parallel to the underside (25) of the shear bar (16).

4. A chopping unit (10) of a forage harvester comprising, a chopping drum (11) bearing chopping blades (15), a shear bar carrier (17) bearing a shear bar (16) for the chopping blades (15), wherein a top side (20) of the shear bar (16), facing away from the shear bar carrier (17), provides a singular cutting edge (21) of the shear bar (16) adjacent the chopping drum (11), wherein
the top side (20) of the shear bar (16) extends between the singular cutting edge (21) adjacent the chopping drum (11) an opposite edge (22) of the shear bar (16) and has a plurality of planar segments including a first top-side planar segment (27) and a second top-side planar segment (26) and wherein the second top-side planar segment (26) extends from the singular cutting edge (21) towards the middle portion and the first top-side planar segment (27) extends from the opposite edge (22) toward the first top-side planar segment (26) at the middle portion thereby forming roof-shaped contouring of the top side (20) of the shear bar (16).

5. The chopping unit (10) of a forage harvester according to claim 4 further comprising two additional top-side segments (24), one of the additional top-side segments being disposed between the cutting edge (21) and the second top-side planar segment (26) and the other of the additional top-side segments being disposed between the opposite edge (22) and the first top-side planar portion (27).

6. The chopping unit (10) of a forage harvester according to claim 5, wherein the two additional top-side portions are parallel or approximately parallel to the underside (25) of the shear bar (16).

* * * * *